Jan. 16, 1962     E. C. HUEBSCHMANN     3,016,752
TRANSISTOR TYPE ACCELEROMETER
Filed Nov. 16, 1960     2 Sheets-Sheet 1

A

B

C

D

E

F

*INVENTOR.*
EUGENE C. HUEBSCHMANN
BY
   ATTORNEY

AGENT

Jan. 16, 1962     E. C. HUEBSCHMANN     3,016,752
TRANSISTOR TYPE ACCELEROMETER

Filed Nov. 16, 1960     2 Sheets-Sheet 2

*INVENTOR.*
EUGENE C. HUEBSCHMANN
BY
    ATTORNEY

AGENT

United States Patent Office 3,016,752
Patented Jan. 16, 1962

3,016,752
TRANSISTOR TYPE ACCELEROMETER
Eugene C. Huebschmann, Brevard County, Fla., assignor to the United States of America as represented by the Secretary of the Air Force
Filed Nov. 16, 1960, Ser. No. 69,779
2 Claims. (Cl. 73—517)
(Granted under Title 35, U.S. Code (1952), sec. 266)

The invention described herein may be manufactured and used by or for the United States Government for governmental purposes without payment to me of any royalty thereon.

This invention relates to a transistor type accelerometer.

One object of the invention is to provide a very sensitive accelerometer.

This and other objects will be more fully understood from the following detailed description taken from the drawing wherein.

The need exists for very sensitive devices for measuring very small accelerations. It has been found that a junction transistor having a field electrode adjacent the junction is very sensitive to the positioning of the field electrode, so that very small movement of the electrode due to acceleration will be indicated by a change in the current flow in the emitter-collector circuit.

Figure 1:
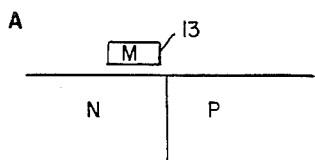
FIGURE 1 shows characteristic curves for the device of FIGURE 2 under various conditions.
Figure 1:
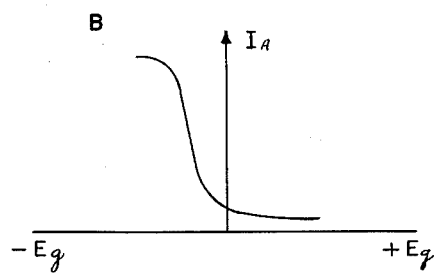
Figure 1:
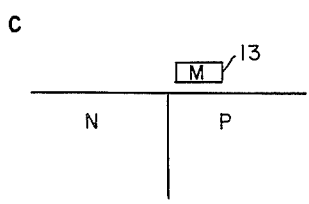
Figure 1:
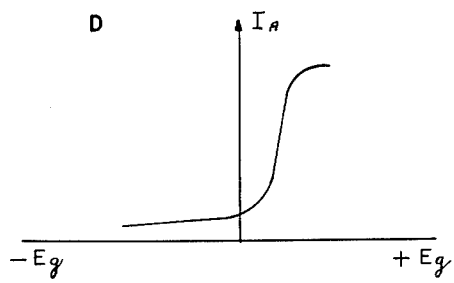
Figure 1:
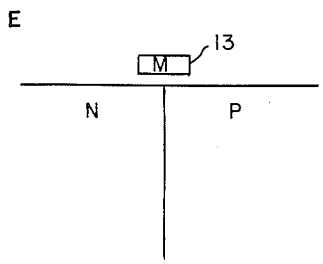
Figure 1:
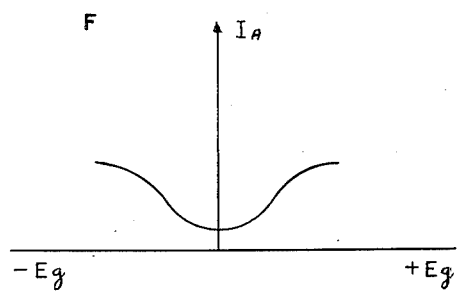

With the field electrode for a junction transistor in the position as shown in A of FIGURE 1, the curve $I_a$ versus $E_g$ is shown in the waveform at B. As seen in FIGURE 1B, as the voltage $E_g$ is changed from a negative to a positive value, the current $I_a$ will show a decrease in value. With the electrode 13 in the position shown in C of FIGURE 1, the waveform will be as shown in D as $E_g$ is changed from a negative to a positive value. From this it can be seen that by setting the value $E_g$, the device will be able to sense movement of the field electrode 13. Thus, if electrode 13 is given a mass M, and is free to move, the device can be used to measure acceleration. Since the junction 14 is only approximately 1 micron in width, only a slight movement of the mass M is necessary to give an indication of $I_a$ on meter 15.

Figure 2:
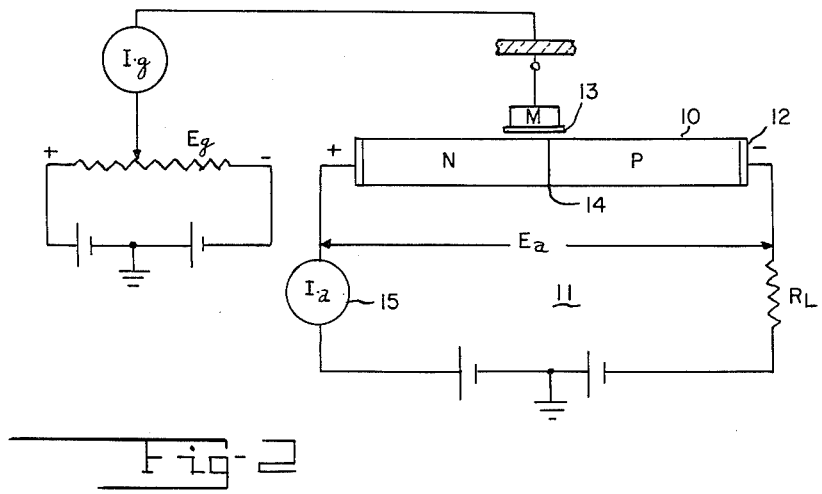
FIGURE 2 shows an accelerometer according to one embodiment of the invention; and, FIGURE 3 shows an accelerometer according to a further embodiment of the invention.

Referring now to FIGURE 2 of the drawing, reference numeral 10 shows a NP type transistor which is biased in reverse direction by a voltage $E_a$ from source 11. A load resistor $R_L$ is connected between the source 11 and the collector terminal 12. A field electrode 13 is located adjacent the NP junction 14 and has a mass M connected thereto which is free to move in response to an acceleration. Voltage source $E_g$ provides the potential for field electrode 13. It is obvious that the electrode 13 could itself have a mass M.

Figure 3:
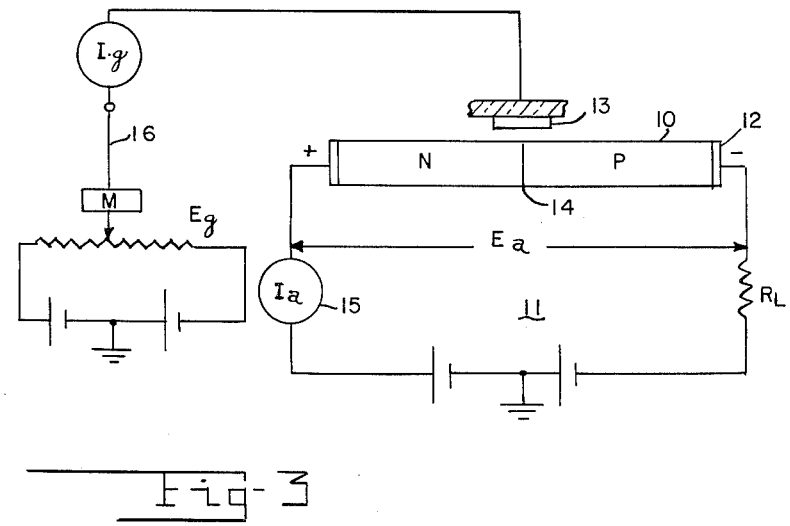

It is obvious from FIGURE 2 that the electrode 13 could be fixed and that the acceleration measurement could be obtained by changing the potential applied to this electrode. FIGURE 3 shows one arrangement which could be used to produce this result. In this figure, the mass M is connected to the potentiometer arm 16 so that an acceleration will cause movement of the potentiometer arm thus changing the voltage $E_g$ which will produce an indication on meter 15. FIG.1, E shows a stationary electrode and FIG. 1, F shows how $I_a$ varies with a change in $E_g$ applied to the electrode in FIG. 1, E to produce an acceleration indication.

There is thus provided a device which is very sensitive to acceleration.

While the specific embodiments have been described in detail, it is obvious that numerous changes can be made without departing from the general principles and scope of the invention.

I claim:

1. An accelerometer comprising: an NP junction type transistor, means for providing a reverse bias across said junction, a field electrode adjacent said junction, means including a free moving support for moving said field electrode relative to said junction in response to an acceleration applied to said accelerometer, means for applying a bias voltage to said field electrode, and means for sensing a change in current flow through said transistor in response to movement of said field electrode.

2. An accelerometer comprising: an NP junction type transistor, means for providing a reverse bias across said junction, a field electrode adjacent said junction, means for movably supporting said field electrode adjacent said junction, means connected to said field electrode for moving said field electrode relative to said junction in response to an acceleration applied to said accelerometer, means for applying a bias voltage to said field electrode, and means for sensing a change in current flow through said transistor in response to movement of said field electrode.

References Cited in the file of this patent

UNITED STATES PATENTS

| | | |
|---|---|---|
| 2,553,491 | Shockley | May 15, 1951 |
| 2,790,089 | Pelfrey | Apr. 23, 1957 |
| 2,802,160 | Engeler | Aug. 6, 1957 |
| 2,866,857 | Andrews | Dec. 30, 1958 |
| 2,904,681 | Jones et al. | Sept. 15, 1959 |
| 2,929,885 | Mueller | Mar. 22, 1960 |
| 2,951,204 | Lemson | Aug. 30, 1960 |